United States Patent [19]

Ritchie

[11] Patent Number: 4,554,061

[45] Date of Patent: * Nov. 19, 1985

[54] ANODIC ELECTRODEPOSITION OF CHARGED AQUEOUS POWDER SLURRY

[75] Inventor: Robert J. Ritchie, Wilmington, Del.

[73] Assignee: E. I. Du Pont de Nemours and Company, Wilmington, Del.

[ * ] Notice: The portion of the term of this patent subsequent to May 28, 2002 has been disclaimed.

[21] Appl. No.: 435,031

[22] Filed: Oct. 18, 1982

[51] Int. Cl.$^4$ ..................... C25D 13/06; C25D 13/10; B05D 7/26

[52] U.S. Cl. ................................ 204/181.6; 427/222; 428/407; 523/402; 523/414

[58] Field of Search ............ 204/181 R, 181 C, 181 N, 204/181 T; 427/222; 428/407; 523/402, 414

[56] References Cited

U.S. PATENT DOCUMENTS

| | | | |
|---|---|---|---|
| 3,575,909 | 4/1971 | Gilchrist | 260/29.2 |
| 3,647,661 | 3/1972 | Matsushita | 204/181 |
| 3,657,092 | 4/1972 | Fischer et al. | 204/181 |
| 3,869,366 | 3/1975 | Suzuki et al. | 204/181 |
| 3,920,468 | 11/1975 | Brown et al. | 106/286 |
| 3,970,621 | 7/1976 | Kondo et al. | 260/18 EP |
| 4,086,153 | 4/1978 | Ariga et al. | 204/181 R |
| 4,122,060 | 10/1978 | Yallourakis | 260/37 EP |
| 4,208,261 | 6/1980 | Todoroki et al. | 204/181 C |
| 4,251,426 | 2/1981 | McClure et al. | 260/37 EP |
| 4,338,235 | 7/1982 | Hazan | 204/181 C |

FOREIGN PATENT DOCUMENTS

| | | |
|---|---|---|
| 51-44540 | 11/1976 | Japan . |
| 1496224 | 12/1977 | United Kingdom . |

*Primary Examiner*—Andrew H. Metz
*Assistant Examiner*—B. J. Boggs, Jr.
*Attorney, Agent, or Firm*—Richard H. Burgess

[57] ABSTRACT

A process for cathodic electrodeposition of small particle, below 20 μm, resin powders coated with precipitated or adsorbed metal oxide or hydroxide at a pH above the isoelectric point giving a zeta potential of at least as negative as minus 35 millivolts. The preparation of the bath is also part of the invention.

10 Claims, No Drawings

ANODIC ELECTRODEPOSITION OF CHARGED AQUEOUS POWDER SLURRY

BACKGROUND

This invention relates to an anodic process for the electrodeposition of polymer powders. More particularly, it relates to such a process wherein the powders are coated with metal oxides or hydroxides.

Previous work includes cathodic electrodeposition processes which deposit a variety of types of polymers and micron-sized polymer powders blended with metal oxide, hydroxide and metallic powders. See U.S. Pat. Nos. 4,086,153—Ariga et al granted Apr. 25, 1978; 3,920,468—Brown et al, granted Nov. 18, 1975; 3,657,092 Fischer et al, granted Apr. 18, 1972; 3,575,909—Gilchrist, granted Apr. 20, 1971. Similar technology for electrodepositing magnetic layers is the subject of U.S. Pat. No. 3,647,661 Matsushita, granted Mar. 7, 1972. Generally, the ionic structure of the polymer is important so that it can be electrodeposited directly rather than relying on entanglement or entrainment for codeposition with, for instance, charged oxide particles. Published Japanese patent application No. 51-44540—Origa et al, of Nov. 29, 1976, codeposits resin particles which need not be charged along with charged metal oxide particles. U.S. Pat. Nos. 3,869,366—Suzuki et al, granted Mar. 4, 1975, and 4,208,261—Todoroki et al, granted June 17, 1980, both relate to electrocoating with a cationic binder resin and a nonionic resin powder dispersed therein.

U.S. Pat. No. 4,122,060—Yallourakis, granted Oct. 24, 1978, and U.S. Pat. No. 4,251,426—McClure et al, granted Feb. 17, 1981, both relate to epoxy resin powder coating compositions. Both can be applied by a variety of techniques, but optimum electrocoating methods have not been available for their application due to the lack of appropriate electrical charges built into the polymers. These two patents are incorporated herein by reference.

SUMMARY OF THE INVENTION

The present invention provides a process for the electrodeposition of paint on an anodic surface wherein an aqueous coating bath of said paint is provided with a negatively charged cathode and with a positively charged anode which is to be coated with said paint, the solids content of said paint consisting essentially of particles of a polymer powder having an average particle size measured optically of not more than about 20 μm, said particles being coated with amphoteric metal oxide or hydroxide precipitated or adsorbed thereon in an amount sufficient to cause said particles to migrate toward said anode under the influence of the charged voltage, the pH of said bath being in a range above the isoelectric point such that the zeta potential of said coated particles is at least as negative as about minus 35 millivolts.

In another embodiment, the present invention provides a process for the preparation of an aqueous coating bath to be used in the above electrodeposition process wherein an aqueous powder slurry of said polymer powder is mixed with a solution of metal salt which can convert to said amphoteric metal oxide or hydroxide at a pH and temperature at which said precipitation does not occur rapidly, and then preferably the pH is lowered and the temperature is raised to a level which causes rapid precipitation of such amphoteric metal oxide or hydroxide onto said particles of polymer powder.

Preferably, in either embodiment of the invention, separately or collectively, said polymer powder is an epoxy resin which has an average particle size in the range of 2-15 μm, said amphoteric metal oxide or hydroxide is silicon dioxide, and the pH of said bath is between 6.0 and 11.0. Specific preferred epoxy resins are disclosed.

DETAILED DISCLOSURE

The present invention provides a means for anodically electrodepositing polymer powders which may be nonionic. This can be done at pH levels even below 7, which is normally thought of as the lower limit for anodic electrodeposition.

The isoelectric point of $SiO_2$ is at a pH of 1.8. The isoelectric point is that pH below which the zeta potential is positive and above which it is negative. The zeta potential is a measure of the surface charge on particles in a dispersed state. It can be measured readily by various means including the Penkem System 3000 made by The Penkem Company of New York. The present invention permits anodic electrodeposition at pH levels as low as about 5.0, more precisely down to levels at which the zeta potential is still at least as negative as about minus 35 millivolts. This provides the necessary driving force for practical electrodeposition. At pH levels of about 7.0 or higher, there is greatly reduced concern about corrosion of the coating equipment and surrounding facilities.

The aqueous powder slurry or dispersion of the invention is composed of finely divided polymer powders which are dispersed in an aqueous solution of a metal salt, the metal of which has the ability to form an amphoteric metal hydroxide and/or oxide. Upon lowering the pH of the dispersion of the polymer powder in a metal salt solution, the equilibrium proportions of the amphoteric metal hydroxide and/or oxide increases and precipitation onto the powder particles occurs rapidly. Depending upon the final pH of the dispersion, the metal hydroxide and/or oxide coated powder particles exhibit the amphoteric properties associated with amphoteric metal oxides. At pH values above the isoelectric point of the metal oxide the composite particles act as anions, and at pH values below the isoelectric point of the metal oxide the composite particles would act as cations under the influence of a direct current potential. However, it is generally not feasible to pass through the isoelectric point by decreasing the pH because there is a strong tendency for the bath to coagulate or precipitate en masse as the isoelectric point is reached.

The electrodeposition of the composite particles can be accomplished in a conventional electrodeposition system to produce partially coalesced powder films, depending on the exact composition of the polymer particle. Upon heating, the powder films are converted into smooth, completely coalesced, continuous polymer films with good adhesion to the metal substrate. After heating at 130° C. for 30 minutes, the films provide very good corrosion resistance.

Although the solids content of coating compositions used in the invention consists essentially of resin powder particles coated with metal oxides or hydroxides, other ingredients can be present which do not materially change the basic and novel characteristics of the invention, including solvents, pigments, crosslinkers, flow-control and coupling agents, fillers and other adjuvants.

The surface of the cured coating can be made so smooth that only a single topcoat is necessary to achieve a coating with a good appearance. Thus, the primer and the primer/surfacer normally applied as two separate coats are in effect deposited in one step. This invention can be employed with any metal oxide which exhibits amphoteric properties and becomes associated with the powder polymer particles by precipitation or adsorption. Suitable metal oxides and/or hydroxides include $SiO_2$, $Al_2O_3$, $Cu(OH)_2$, $Cr_2O_3$, $Fe_3O_4$, $SnO_2$, $TiO_2$, and $ZnO$. Mixed metal oxides and metal oxide coated metal oxides are also possible. The nature of the outer layer of powder particles generally controls the electrodeposition characteristics of a layered composite powder.

The best results are obtained with the use of $NaSiO_3.9H_2O$ solutions from which $SiO_2$ is precipitated. The pH value of the powder dispersion is adjusted to the optimum pH for the electrodeposition bath.

This invention can be employed with any particulate polymer suitable for a coating or paint which can be prepared in powder form, for, example, epoxies, acrylics, polyesters, polyamides, polyimides, polyurethanes, polycarbonates, etc. Mixtures of polymers can also be used. The average powder particle size, measured optically, can range from 0.1 to 20 μm with the preferred size between 2 and 15 μm and the optimum from 2 to 7 μm. The particle size influences both adhesion and appearance of the final film.

The aqueous dispersion is prepared by methods which are known in the paint industry. The powdered polymer can be stirred directly into the aqueous solution of the metal salt or dispersed with the aid of a high speed dispersing apparatus. Small amounts of surfactants or emulsifiers may also be employed to aid the dispersion process. Another means of preparing the dispersion consists of mixing an aqueous suspension of a powdered polymer directly into the aqueous solution of the metal salt or vice-versa.

For carrying out the deposition the dispersion is diluted with deionized water to a solids contents of 5 to 30%, preferably between 10 and 20%. When $SiO_2$ is used, the final pH should be between 6.0 and 11.0, preferably between 7.0 and 9.0. During the deposition, the dispersion is kept at temperatures suitable for deposition of the resins, such as between 15° and 40° C. For the preferred epoxy resins, the maximum temperature should be no higher than 35° C., preferably no higher than 34° C. The substrate to be coated is immersed in the dispersion and connected as the anode. The cathode can be any conducting substrate, such as stainless steel, graphite or a noble metal. A direct current is passed through the dispersion between the anode and the cathode.

The preferred deposition voltage is in the range of 20 to 400 volts. Under these conditions a coating is deposited on the anode. Deposition is carried out until the desired film thickness has been achieved. It is a particular advantage that film thicknesses of up to 150 μm are obtained on the coated substrate even after a brief period. Depending on the polymer powder chosen, periods as low as 10 seconds are adequate in some cases to obtain these film thicknesses. After the substrate has been removed from the coating bath, the coating is rinsed with water and is baked for 5 to 45 minutes at temperatures between 130° C. and 200° C. In some cases it is appropriate to interpose a preliminary drying step before baking.

Since the electrocoating bath becomes depleted in polymer powder during the deposition process, it is periodically necessary to replenish the bath with metal-oxide- or hydroxide-coated polymer powder, so that the approximate original composition of the aqueous dispersion is always maintained. The pH value should be kept at 6.0 to 10.0 during the entire deposition process.

The properties of the baked coating are excellent from a technological point of view. The corrosion resistance is surprisingly good and varies with the nature of the solid powder. Using the aqueous dispersion according to the invention, a somewhat porous film is achieved, which impairs the throwing power. The baked film can be subjected without difficulty to further lacquering using conventional lacquers. Percentages, parts and proportions given are by weight except where indicated otherwise.

The following examples illustrate the invention. In the preparatory example, the components will be referred to according to the following numbering system:

(1) Epoxy resin having the formula

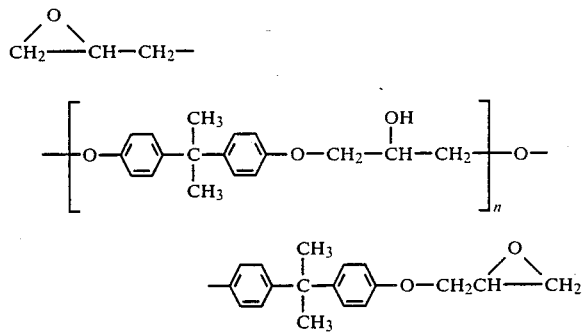

where n is sufficiently large to provide a resin having a Gardner-Holdt viscosity of O-S and an epoxide equivalent weight of 700–850.

(2) Phenol-modified epoxy resin which is an epoxy resin (epoxide equivalent weight 186–192) of the formula of (1) above reacted with bisphenol-A and phenol in an epoxy-resin/bisphenol-A/phenol equivalent-weight ratio of 1.82/1.0/0.5 to provide a phenol-modified epoxy resin having an epoxide equivalent weight of 590–630.

(3) Curing agent which is a combination of:
(a) a mixture of compounds of the general formula

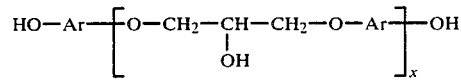

where

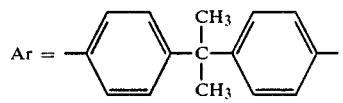

and x is 0 or a positive number, providing a mixture of compounds with an equivalent weight of 200–1000; and (b) 0.67% by weight, based on the weight of (a), of 2-methylimidazole.

PREPARATORY EXAMPLE

An epoxy resin system for use in the present invention can be made in accordance with the teachings of the above-mentioned U.S. Pat. No. 4,251,426.

The following components are blended as described:

|  | Parts by Weight |
| --- | --- |
| Portion 1 | |
| Component 1 | 38.4 |
| Component 2 | 25.6 |
| Component 3 | 20.7 |
| "Fluorad" (flow control agent) | 0.6 |
| Triethanol amine | 1.5 |
| Portion 2 | |
| Talc particles, maximum diameter of 20 microns | 2.5 |
| Titanium dioxide pigment | 11.5 |
| Carbon black | 0.5 |

Portion 1 is charged into a Welex grinder-mixer and mixed for 30 seconds. Portion 2 is then added and mixing is continued for one minute. This blend is then charged into a melt extruder and extruded at 88°–94° C. The extrudate is chilled, broken into chips, and then charged into a grinding mill where it is ground to a fine powder. The powder is then passed through a standard 200-mesh screen to remove particles of maximum dimension greater than 75 $\mu$m, and the powder is then further comminuted by air micronization down to an average particle size of about 5 $\mu$m.

Other epoxy systems could be used including that of the above-mentioned U.S. Pat. No. 4,122,060.

EXAMPLE

An electrodeposition bath accordng to the invention is made and used as follows:

|  | Parts by Weight |
| --- | --- |
| mixed polymer from the Preparatory Example | 180.0 |
| gum arabic | 0.5 |
| guar gum | 0.5 |
| NaSiO$_3$.9H$_2$O | 2.25 |
| deionized H$_2$O | 1100 |

The aqueous dispersion is prepared by dissolving the gum arabic and the guar gum in separate 300 ml volumes of deionized water. The two gum solutions are then combined. The mixed polymer from the Preparatory Example is dispersed with stirring into the 600 ml gum solution. The resulting dispersion is ground in an attritor until the ultimate particle size of about 5 $\mu$m is reached, typically 30 min. The dispersion is filtered and charged with the NaSiO$_3$ and the remaining 500 ml of deionized H$_2$O. The resultant dispersion is very stable against hard settling and has a measured pH of 10.0.

A phosphatized sheet of steel is immersed in this dispersion and connected as the anode. A sheet of stainless steel is immersed and connected as the cathode.

Powder films have been electrodeposited from this dispersion at a 60 volt DC potential with a 30 second deposition time.

Alternatively, applying a direct current at a voltage of 40 volts and a bath temperature of 34° C., a coating was deposited on the anode sheet for 30 seconds. The sheet which has been rinsed with demineralized water and is then baked for 30 minutes at 130° C. A continuous film having a film thickness of 40 to 50 $\mu$m is formed on the side of the sheet facing the cathode.

I claim:

1. A process for the preparation of an aqueous coating bath to be used in an electrodeposition process wherein aqueous powder slurry of particles of polymer powder having an average particle size measured optically of not more than about 20 $\mu$m is mixed with a solution of metal salt which can convert to amphoteric metal oxide or hydroxide at a pH at which precipitation does not occur, and then the pH is lowered to a level which causes precipitation of such amphoteric metal oxide or hydroxide onto said particles of polymer powder.

2. An electrocoating process for the electrodeposition of paint on an anodic surface wherein an aqueous coating bath prepared by the process of claim 10 containing said paint is provided with a negatively charged cathode and with a positively charged anode which is to be coated with said paint, the solids content of said paint consisting essentially of particles of a polymer powder having an average particle size measured optically of not more than about 20 $\mu$m, said particles being coated with amphoteric metal oxide or hydroxide precipitated or adsorbed thereon in an amount sufficient to cause said particles to migrate toward said anode under the influence of said charge, the pH of said bath being in a range above the isoelectric point such that the zeta potential of said coated particles is at least about as negative as minus 35 millivolts, said electrocoating process comprising the steps of applying a voltage between said anode and said cathode to cause said paint to be deposited on the anode, separating the anode from the bath, and drying and curing the paint deposited on the anode.

3. The process of claim 2 wherein said polymer powder is an epoxy resin.

4. The process of claim 3 wherein said polymer powder has an average particle size in the range of 2–15 $\mu$m.

5. The process of claim 2 wherein said polymer powder consists essentially of finely-divided particles at least 90 percent by weight of which have a maximum particle size not exceeding 20 $\mu$m wherein the particles are a blend of (A) 30–45 parts by weight of an epoxy resin of the formula

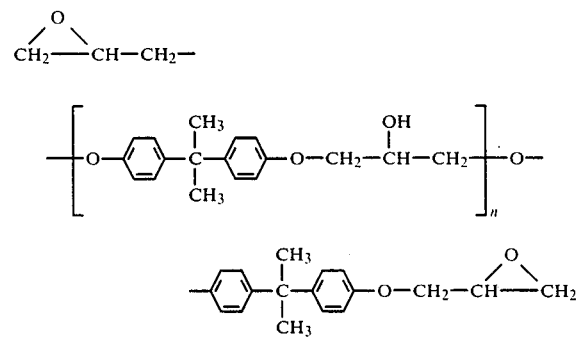

wherein n is sufficiently large to provide a resin having a Gardner-Holdt viscosity of O-S and an epoxide equivalent weight of 700-850;

(B) 18-80 parts by weight of a phenol-modified epoxy resin which is a resin of the general formula of (A) which has been modified with bisphenol-A and phenol to provide a phenol-modified epoxy resin having an epoxide equivalent weight of 550-675;

(C) 15-30 parts by weight of a resinous curing agent consisting essentially of:

(1) a mixture of compounds of the general formula

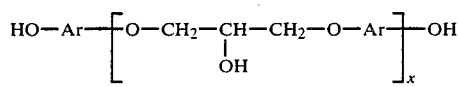

where

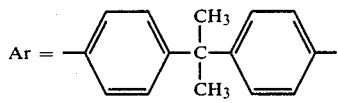

and where x is 0 or a positive number providing a mixture of compounds having an equivalent weight of 200-1000, and (2) 0.2-5.0 percent by weight, based on the weight of (1), of an accelerator which is imidazole, a mono or dialkyl imidazole, dialkyl amino methyl phenol, or mixtures of these.

6. The process of claim 2 wherein said polymer powder consists essentially of finely-divided particles at least 90 percent by weight of which have a maximum particle size not exceeding 20 μm wherein the particles are a blend of:

(A) 38-40 parts by weight of an epoxy resin of the formula

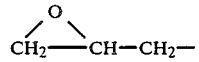

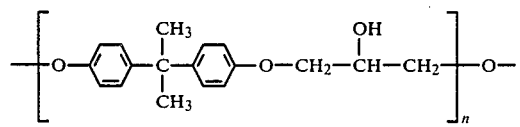

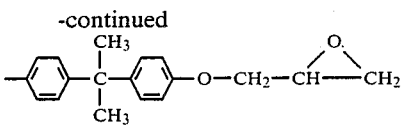

where n is sufficiently large to provide a resin having a Gardner-Holdt viscosity of O-S and an epoxide equivalent weight of 700-850;

(B) 25-27 parts by weight of a phenol-modified epoxy resin which is a resin of the general formula of (A) which has been modified with bisphenol-A and phenol to provide a resin having an epoxide equivalent weight of 590-630;

(C) 19-21 parts by weight of a resinous curing agent consisting essentially of (1) a mixture of compounds of the general formula

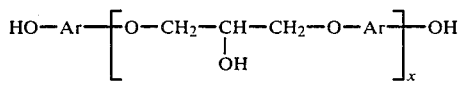

where

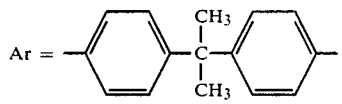

and where x is 0 or a positive number, providing a mixture of compounds with an equivalent weight of 200-1000, and (2) 0.5-0.7 percent by weight, based on the weight of (1), of 2-methylimidazole.

7. The process of claim 6 wherein an aqueous powder slurry of said polymer powder is provided including a small but effective amount of at least one of gum arabic and guar gum to act as a surfactant before mixing with the solution of said amphoteric metal oxide or hydroxide.

8. The process of claim 2 wherein said amphoteric metal oxide or hydroxide is silicon dioxide.

9. The process of claim 2 wherein the pH of said bath is between 6.0 and 11.0.

10. The process of claim 2 wherein said polymer powder is an epoxy resin, which has an average particle size in the range of 2-15 μm, said amphoteric metal oxide or hydroxide is silicon dioxide and the pH of said bath is between 6.0 and 11.0.

* * * * *